(12) United States Patent
Anschutz

(10) Patent No.: US 7,061,919 B1
(45) Date of Patent: Jun. 13, 2006

(54) SYSTEM AND METHOD FOR PROVIDING MULTIPLE CLASSES OF SERVICE IN A PACKET SWITCHED NETWORK

(75) Inventor: Thomas Anschutz, Conyers, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 838 days.

(21) Appl. No.: 09/903,793

(22) Filed: Jul. 12, 2001

(51) Int. Cl.
H04L 12/56 (2006.01)
(52) U.S. Cl. .................. 370/395.43; 370/429
(58) Field of Classification Search ............ 370/229, 370/235, 368, 371, 378, 381, 389, 399, 395.1, 370/396, 395.21, 395.31, 395.4, 395.42, 370/395.43, 360, 395.41, 412, 428, 429
See application file for complete search history.

(56) References Cited

U.S. PATENT DOCUMENTS

| | | | | |
|---|---|---|---|---|
| 5,937,169 A | * | 8/1999 | Connery et al. ............ | 709/250 |
| 5,991,302 A | * | 11/1999 | Berl et al. .................. | 370/400 |
| 6,108,307 A | * | 8/2000 | McConnell et al. ........ | 370/235 |
| 6,278,708 B1 | * | 8/2001 | Von Hammerstein et al. ... | 370/389 |
| 6,707,799 B1 | * | 3/2004 | Chui ......................... | 370/282 |

OTHER PUBLICATIONS

Jæger, Bjørn, Internet Quality of Service (QoS) Issues In Competitive Commercial Network Operation, Presentation on Topic For Doctoral Dissertation, Department of Informatics, University of Bergen, Sep. 4, 2000.

* cited by examiner

Primary Examiner—Brenda Pham
(74) Attorney, Agent, or Firm—Lee & Hayes, PLLC

(57) ABSTRACT

A method for providing a plurality of service classes in a network for transporting a data packet. The managed elements in a network are partitioned into a plurality of element instances, each element instance is engineered to provide one of the service classes, and the data packet is handled by each managed element with the element instance corresponding to the service class of the data packet. The service classes that may be provided are unlimited. The method may further comprise determining the service class of the data packet, typically at the first managed element lying near the edge of the network to handle the data packet. After the first managed element to handle the data packet determines its service class and the appropriate element instance forwards the data packet the subsequent managed elements to handle the data packet need not identify its service class but simply utilize the same element instance as that utilized by the forwarding managed element. Also, a network for transporting a data packet to be afforded one of a plurality of service classes, comprises a plurality of managed network elements, each managed element partitioned into a plurality of element instances, each element instance in a given managed element engineered to provide one of the service classes, and a plurality of communication links connecting the managed elements to each other, the communication links carrying the data packet between the managed elements.

5 Claims, 4 Drawing Sheets

200

Processor 201a-b

SYSTEM AND METHOD FOR PROVIDING MULTIPLE CLASSES OF SERVICE IN A PACKET SWITCHED NETWORK

I. BACKGROUND

A. Field of the Invention

This invention relates generally to the field of network design, and more particularly to a system and method for treating data traffic with varying degrees of service.

B. Description of the Related Art

As the use of internets or sets of computer networks connected to each other (of which the Internet is but one example) has steadily increased and progressively larger portions of the general population have access to internets, commercial entities have sought to capitalize on this increasingly popular means of communication by attempting to offer voice, video and data services over these networks. Present day internet topologies however are ill-suited for providing many of these voice, video, and data services with the quality and reliability needed for commercial viability.

Most present day networks operate under no standardized traffic management scheme. Each node or managed element in an administrative domain of a network broadcasts link state information, typically utilizing an interior gateway routing protocol. Based on these broadcasts each element obtains a complete picture of all operational elements in that administrative domain and the communication links connecting those elements. Each element in the administrative domain computes the shortest path to every destination within the domain and builds a forwarding table associating an address prefix with a next hop link. When a data packet arrives the element determines the destination address of the data packet, consults its forwarding table, and sends the data packet out on the appropriate link. Each element makes an autonomous decision about how to forward the data packet and forwarding proceeds in a connectionless manner at every hop. This handling of each data packet in the same way and as fast as possible by managed elements is referred to as "best effort service" and often results in the loss of data packets, congestion on certain links, and the underutilization of alternative links among other things.

Unfortunately though, the human eye and ear is sensitive to both delay in receiving consecutive data packets and variation in the delay between consecutive data packets or jitter—especially when those packets are used to support voice or video applications. Data applications on the other hand can be very sensitive to the loss of data packets as they transit through a network or internet. Finally, voice, video and data services are all typically sensitive to constraints on bandwidth, or the speed with which data packets are exchanged between managed elements. The ability to address all of the foregoing sensitivities by controlling network resources is typically referred to as providing a certain quality of service (QoS) or class of service, and a number of approaches have been or presently are being developed to provide differentiated service or service classes. Each of these approaches utilize one or more of the following traffic management mechanisms: routing, classifying, scheduling, queuing, admission control, policing, and capacity planning.

A first approach is an overlay solution and involves the creation of a data packet over circuit-switched physical network topology such as internet protocol (IP) over asynchronous transfer mode (ATM) with a logical network topology comprised of a mesh of permanent virtual circuits providing point-to-point IP links. The overlay approach however has a number of disadvantages. For instance, there is the need to build and manage two different networks with two different technologies, there is increased complexity of design and management, and the approach can be inefficient due to overhead associated with the circuit-switched layer.

A number of other approaches involve the creation of standard methods of handling data and/or signaling (protocols) between managed elements without regard to the manufacturer of the managed elements within the networks. One protocol approach is Integrated Services or IntServ. IntServ has applications set up paths across an internet and reserve resources before any data packets are sent into the networks. It has four components, signaling, admission control, classification, and scheduling. For signaling IntServ relies on each network element recognizing resource reservation protocol (RSVP) so that resource reservation requests sent into the network with characteristics of the source traffic and service class specifications required by the destination may be acted upon. For admission control, IntServ relies on each intermediate network element either accepting or rejecting reservation requests it receives. If an element accepts a reservation it must install flow state information. IntServ also relies on each network element classifying every data packet it receives. Upon receiving a data packet the network element must classify the data packet based on flow state and place the data packet in an internal queue established for that service classification. Each network element must also have a scheduler that schedules each data packet for retransmission according to its service classification. IntServ has a number of disadvantages. For instance, flow state information is needed for each data packet flow in each network element. IntServ is not very scalable because very large memory and processing capabilities are needed in elements lying at the core of the networks. Finally, the requirements for managed elements are high. Each managed element in each network within the internet must speak RSVP and have the ability to perform admission control, data packet classification, and data packet scheduling.

Another protocol based approach presently working its way towards standardization is Differentiated Services or DiffServ. The premise of DiffServ is that managed elements within the core of the networks will handle data packets in different traffic streams by forwarding them using different per-hop behaviors (PHBs). The PHB to be applied to a particular data packet will be indicated by a DiffServ codepoint (DSCP) embedded in the DiffServ field of each data packet header. The DSCP markings will be applied to data packets either by a trusted upstream node such as a customer, or by managed elements lying at the edge of a network upon entry of the data packets into the network. Under this approach many traffic streams will be aggregated to one of a small number of behavior aggregates (BA) which are each forwarded using the same PHB at the managed element. To accomplish these objectives however, DiffServ requires managed elements within the networks to have a number of capabilities and associated structures such as classifiers, meters, algorithmic droppers, queues and schedulers.

Yet another protocol based approach is Multi Protocol Label Switching (MPLS). Under the MPLS approach a label is inserted in each data packet as it enters an MPLS-capable domain. Labels are distributed by a signaling protocol such as label distribution protocol (LDP) or RSVP. Within the MPLS-capable domain MPLS-capable managed elements examine only the label when forwarding each packet. When a data packet arrives at an MPLS-capable managed element its label is used an index into the forwarding table of the element which specifies a service class. The incoming label is swapped with an outgoing label and the data packet is switched to the next MPLS-capable manage element within the MPLS-capable domain. Before each data packet exits the MPLS-capable domain its label is removed. MPLS, like ATM, relies on introducing a connection-oriented approach.

Thus, it is clear that a number of approaches for providing QoS or service classes within networks exist or are in various stages of development. Each of the existing approaches however requires network operators to invest in and install new managed elements and alter the basic operation of their networks in order to capitalize on the approaches. While this undoubtedly will occur, it will take some time for a single approach to be adopted and the required infrastructure to be manufactured and installed. Accordingly, network operators need a way to offer service classes to their customers utilizing the capabilities of their present day networks while transitioning to another service class approach such as a protocol based approach.

II. SUMMARY OF THE INVENTION

One embodiment of the invention is a method for providing a plurality of service classes in a network for transporting a data packet, the data packet to be afforded a particular service class, the network comprising a plurality of managed network elements connected to each other via a plurality of communication links, comprising partitioning each managed element into a plurality of element instances, engineering each element instance of a given managed element to provide one of the service classes, and handling the data packet at each managed element with the element instance corresponding to the service class of the data packet. The service classes that may be provided are unlimited and include high, medium, and low priority. The method may further comprise determining the service class of the data packet at only one managed element in the network, typically the first managed element to handle the data packet located at the edge of the network. After the first managed element to handle the data packet determines its service class and the appropriate element instance forwards the data packet the next hop element does not determine the classification of the data packet but simply utilizes the element instance corresponding to the element instance utilized by the forwarding managed element.

Another embodiment of the invention is a network for transporting a data packet to be afforded one of a plurality of service classes, comprising a plurality of managed network elements, each managed element partitioned into a plurality of element instances, each element instance in a given managed element engineered to provide one of the service classes, and a plurality of communication links connecting the managed elements to each other, the communication links carrying the data packet between the managed elements. The service classes that may be provided are unlimited and include high, medium, and low priority. A managed element in the network may also have the ability to determine the service class of the data packet, typically where it is located near the edge of the network and likely to be the first managed element to handle the data packet. Other managed elements in the network simply handle the data packet with the element instance corresponding to the element instance utilized by the managed element that forwarded the data packet.

Yet another embodiment of the invention is a managed network element for handling a data packet, the data packet to be afforded one of a plurality of service classes, comprising, a memory, a processor in communication with the memory, executable code running on the processor, and a forwarding table stored in the memory, the memory, processor, executable code, and the forwarding table collectively comprising the element resources, the element resources being partitioned into a plurality of element instances, each element instance being engineered to provide one of the service classes. The service classes that may be provided are unlimited and include high, medium, and low priority. The managed element may determine the service class of the data packet, such as where it is the first managed element to handle the data packet and is located at the edge of a network.

III. BRIEF DESCRIPTION OF THE DRAWINGS

These and other features, aspects, and advantages of the present embodiment of the invention will become better understood with regard to the following description, appended claims, and accompanying drawings where:

IV. DETAILED DESCRIPTION OF THE PREFERRED EMBODIMENTS

Figure 1:
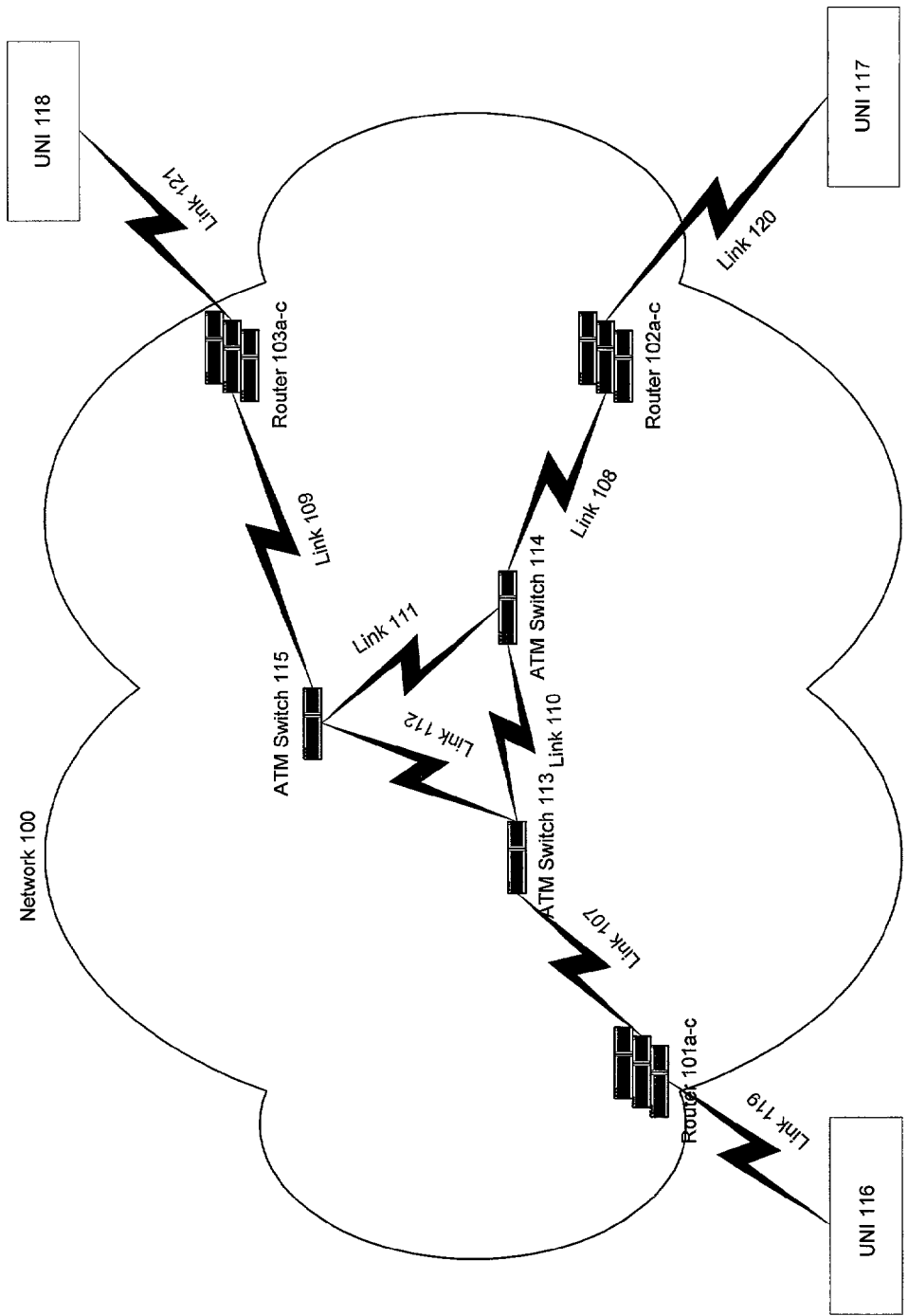
FIG. 1 is a diagram of a service provider network incorporating one embodiment of the invention.

Throughout the following detailed description similar reference numbers refer to similar elements in all the Figs. of the drawings. Referring to FIG. 1, a diagram of a service provider network incorporating one embodiment of the invention is shown. Service provider network 100 is comprised of a number of managed elements, routers 101–103 and asynchronous transfer mode ("ATM") switches 113–115, connected to each other via communications links 107–112. A number of user network interfaces ("UNI") 116–118 are connected to routers 101–103, each of which comprise edge elements in network 100, via communications links 119–121. It will be appreciated that while a limited number and type of managed elements are depicted in network 100, the invention may be embodied in networks comprising any number and type of managed elements connected to each other via communication links.

Routers 101–103 may comprise any one or more of a number of well-known network routers including, but not limited to, routers in compliance with "Requirements for IPv4 Routers," RFC 1812 (June 1995) (http://www.freesoft.org/CIE/RFC/1812/index.htm) published by the Network Working Group of the Internet Engineering Task Force ("IETF") and any revisions or succeeding RFCs thereto, all of which are incorporated herein by reference. An example of one such router presently utilized in the assignee of this invention's networks is the Cisco 7200. ATM switches 113–115 may comprise any one or more of a number of network switches including, but not limited to, switches in compliance with "Ipsilon's General Switch Management Protocol Specification version 2.0," RFC 2297 (March 1998) (http://www.freesoft.org/CIE/RFC/Orig/rfc2297.txt)

published by the Network Working Group of IETF and any revisions or succeeding RFCs thereto, all of which are incorporated herein by reference. An example of one such switch presently utilized in the assignee of this invention's networks is the Lucent CBX500. Communications links 107–112 may comprise any means of connecting routers and ATM switches to each other for the exchange of data packets. An example of one such interconnection mechanism is a DS3 or T3 time division multiplexed (TDM) connection supported by underlying SONET transport elements. Communications links 119–121—may comprise similar TDM connections that provide network service to customers with framing typically provided by HDLC, Frame Relay, or ATM protocols. UNIs 116–118 may comprise, but in no way are limited to, the demarcation points where communication links 119–121 provide network service to customers.

In network 100, three service classes are provided for high, medium, and low, because the resources of each managed router element in network 100 are partitioned into 3 element instances. Specifically, routers 101–103 are each partitioned into three router instances 101a–c, 102a–c, 103a–c. Each of these router partitions is connected to the other router partitions that serve the same class of service using ATM permanent virtual circuits (PVCs). For example, Router 101a would have 2 PVCs that connect it to routers 102a and 103a; router 102b would have 2 PVCs that connect it to routers 101b and 103b, etc. Because the nature of ATM switches is such that each PVC is provided its own queuing mechanism and ATM-standardized class of service, there is no need to further partition an ATM switch to provide different treatment for the different service classes supported in this network. Element instances 101a–103a are each engineered to provide a high class of service or QoS and then connected through 113–115 using ATM PVCs that support that QoS. Element instances 101b–103b are each engineered to provide a medium class of service or QoS and connected with corresponding PVCs. And element instances 101c–103c are each engineered to provide a low class of service or QoS and connected with correspondingly low QoS ATM PVCs. As will be understood by those skilled in the art, the specific handling characteristics associated with any particular service class and engineered into any particular element instance will depend on a variety of factors, including but not limited to, the physical capabilities of the managed element, the nature of the services to be provided by the operator of network 100, and the number of options the operator of network 100 wants to offer its customers. For instance, assuming network elements 101–103 could physically support it, the operator of network 100 could engineer element instances 101a–103a (which correspond to a high service class) for the delivery of voice over internet protocol (VoIP) services, the minimum handling requirements for which are well known by those skilled in the art. The operator of network 100 could engineer element instances 101c–103c (which correspond to a low service class) to provide only a "best effort" service class, similar to that provided by Internet routers today. Finally, the operator of network 100 could engineer element instances 101b–103b (which correspond to a medium service class) for the delivery service of data sensitive to loss, the minimum handling requirements for which are well known by those skilled in the art.

Figure 2:
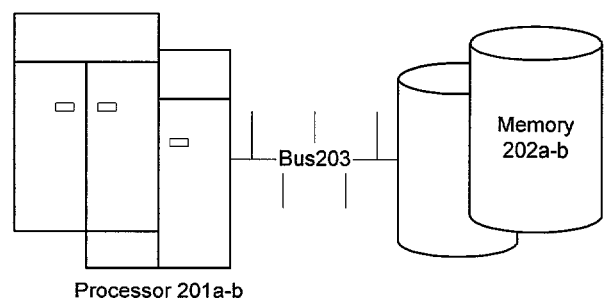
FIG. 2 is a block diagram of a managed element in the network of FIG. 1.

A block diagram of a generic managed element 200 of the type that could be used in network 100 is shown in FIG. 2. Managed element 200 is partitioned into two element instances. Physically, managed element 200 is comprised of processor 201, memory 202, bus 203 connecting processor 201 to memory 202, executable code running on processor 201 (not shown), and a forwarding table (not shown) residing in memory 202. Because the partitioning of managed elements is well known by those skilled in the art and depends on the particular implementation and manufacturer of element 200, it will not be described here further. Logically though, managed element 200 will appear to other elements in the network and operate as though it were two separate managed elements reachable via two separate IP addresses. It should also be noted that various functions and operations that would otherwise be embodied in executable code and implemented with the processor may also be embodied in and implemented with permanent or field-programmable firmware, application specific integrated circuits, programmable gate arrays, and/or reprogrammable gate arrays.

The number of element instances that may be created on managed element 200 in theory is unlimited. In practice however, any particular implementation will only support the number of instances as the manufacturer has provided for. In other words, if the manufacturer of a particular element provides the ability to partition that element 25 times, then that element will support 25 element instances. Thus, assuming every managed element in a network will be utilized with the present invention to provide a plurality of service classes, it will be appreciated that the maximum number of service classes that may be supported will necessarily be limited by the managed element in the network that can support the minimum number of element instances. One skilled in the art will appreciate however that larger numbers of service classes may be supported if the network is engineered to route traffic requiring higher service classes around the network elements that will not support the service class of that traffic.

Referring again to FIG. 1, a customer who has some type of agreement with the operator of network 100, such as a service level agreement, delivers a data packet to network 100 via UNI 116 and link 119, UNI 117 and link 120, or UNI 118 and link 121. For simplicity of explanation it will be assumed that the data packet arrives at router 101 via UNI 116 and link 119, though arrival at router 102 or 103 would result in similar handling only at a different location. Upon receipt of the data packet from UNI 116, router 101 determines the destination address of the data packet and the service class it is to be afforded. The determination of destination address is straightforward and within the knowledge of those skilled in the art. The initial determination of service class may be performed in a number of ways, including but not limited to, observing the fields within the header of the packet and identifying the previous hop of a data packet by observing the router port on which the data packet was received. The fields to be examined in the header of a data packet to determine its service class include, but are not limited to, the source and destination addresses, the originating and destination ports—whose values can indicate the type of application that generated the data packet (e.g., VoIP, video conferencing, interactive game, browser), and/or a field in the internet layer of the TCP/IP protocol suite indicating which transport layer protocol is specified for the data packet. Additional indicators that a customer of network 100 might use to indicate the desired QoS that a packet should receive include Type of Service (ToS) bits (alternately usable as DiffServ bits) and Ethernet precedence bits (from 802.1P).

Figure 3:
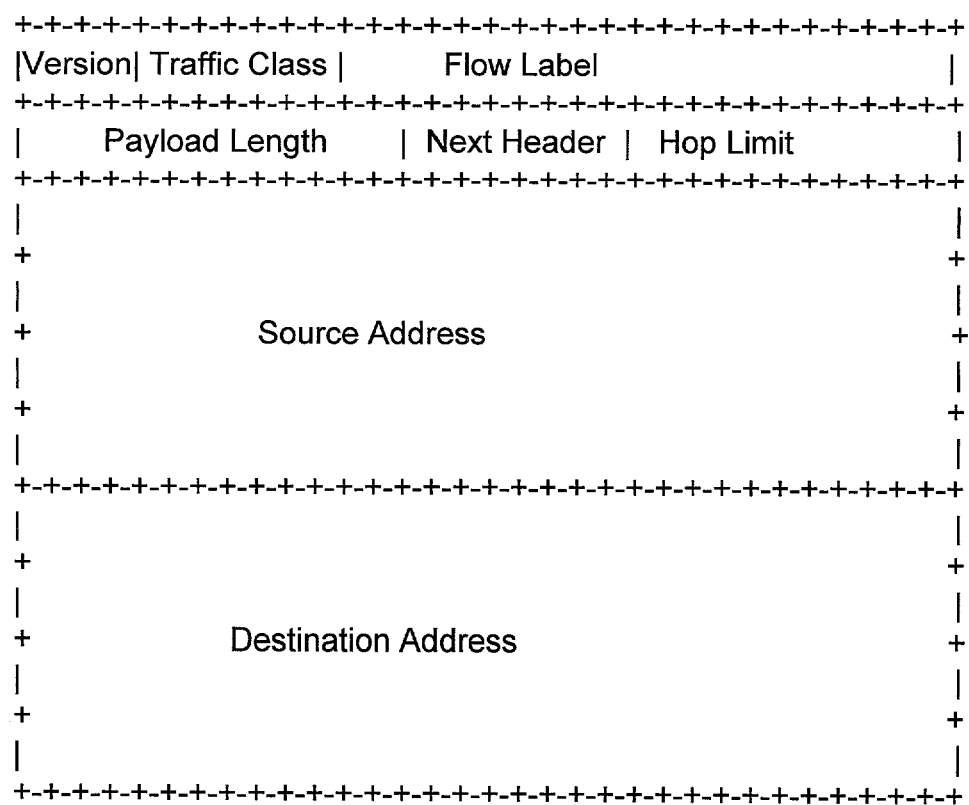
FIG. 3 is a diagram of a version 6 internet protocol header.
Figure 4:
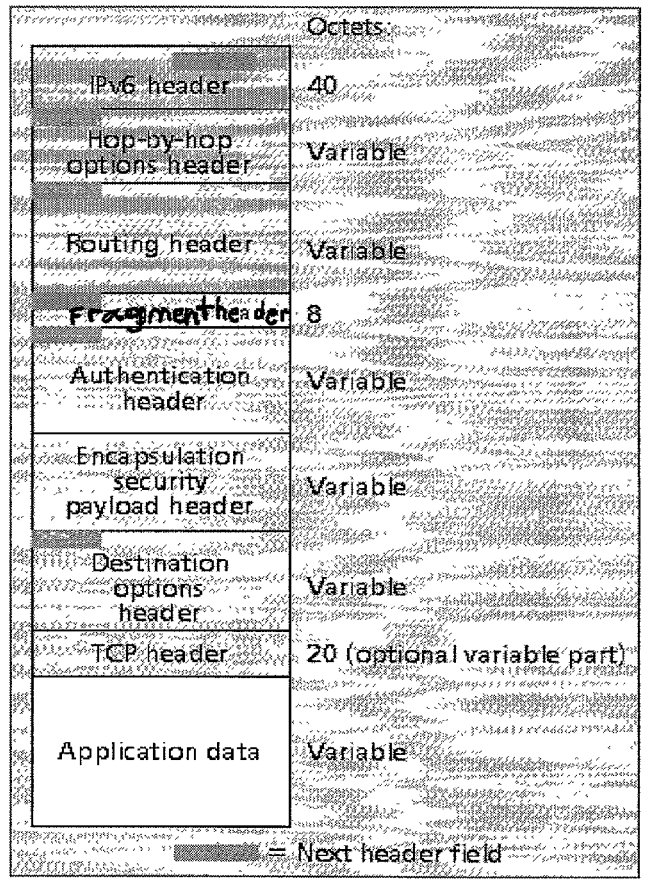
FIG. 4 is a diagram of a version 6 internet protocol header and the presently contemplated extensions thereto.
Figure 5:
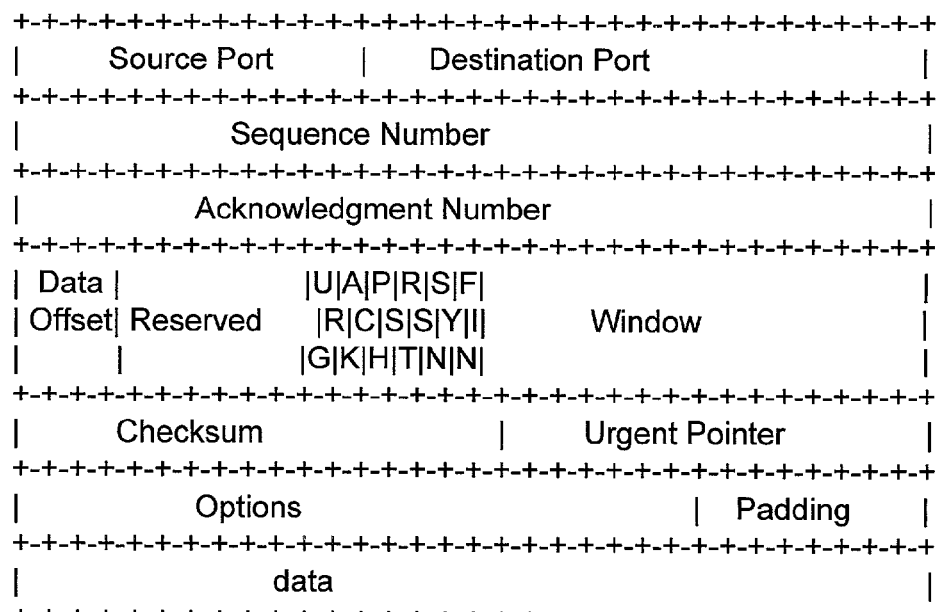
FIG. 5 is a diagram of a version 4 transmission control protocol header.

FIGS. 3–5 show a number of standard data packet header fields in the TCP/IP protocol suite. FIG. 3 shows the format of an IPv6 header. Note that both the source address and destination address of the data packet are found in the IP header. FIG. 4 shows the IPv6 header and the presently contemplated extension headers thereto. Note that the TCP header field, which identifies the transport layer protocol for the data packet, can be found as an extension to the IPv6 header. Finally, FIG. 5 shows the format of a version 4 TCP header—the type typically used today. Note that the source and destination ports for the data packet are found in the TCP header. It will be appreciated that while the header formats and fields illustrated in FIGS. 3–5 are presently in widespread use the invention is not limited to these fields and formats. They are merely exemplary.

Having determined the destination address and service class to be afforded, router 101 assigns the data packet to its appropriate element instance and forwards it to the next appropriate router instance in network 100. For example, if router 101 determined that the data packet has a destination address lying outside UNI 117 and is to be afforded a high service class, router 101 would assign it to router instance 101a and forward it to ATM switch 113 via link 107 and the corresponding PVC that provides a high QoS path to router instance 102a. ATM switch 113 would forward the data packet (in accordance to the PVC set up between 101a and 102a) to router instance 102a via link 108, and router instance 102a would forward the data packet to UNI 117 via link 120 for delivery to the destination address. Note that no marking of the data packet with respect to its service class by either the source of the data packet, the customer, or any managed element within network 100 is necessary. By virtue of the data packet having been identified by router 101 and handled by router instance 101a all subsequent routers within network 100 handle the data packet with element instance a, thereby providing the data packet a high service class across network 100. In other words, with the present invention the service class to be afforded a data packet is identified at the edge of the service provider network and the data packet is then placed into and handled by a virtual network engineered to provide the appropriate service class.

In the case of network 100, managed element instances (101a–103a) and the links connecting those instances (107–109, 110–112 and the PVCs connecting them) comprise a virtual network engineered to provide a high service class. Managed element instances b (101b–103b) and the links connecting those instances (107–109, 110–112 and the PVCs connecting them) comprise a second virtual network engineered to provide a medium service class. Finally, managed element instances c (101c–103c) and the links connecting those instances (107–109, 110–112 and the PVCs connecting them) comprise a third virtual network engineered to provide a low service class. There is no need for further analysis of the service class to be afforded and no need to mark the packet with its service class. The need to utilize different queuing and schedulers to appropriately support the different traffic types is embodied by the (virtual) network that supports the traffic, and need not be re-assessed, reassigned, labeled or signaled within the network or at any of the managed elements within network 100.

Figure 6:
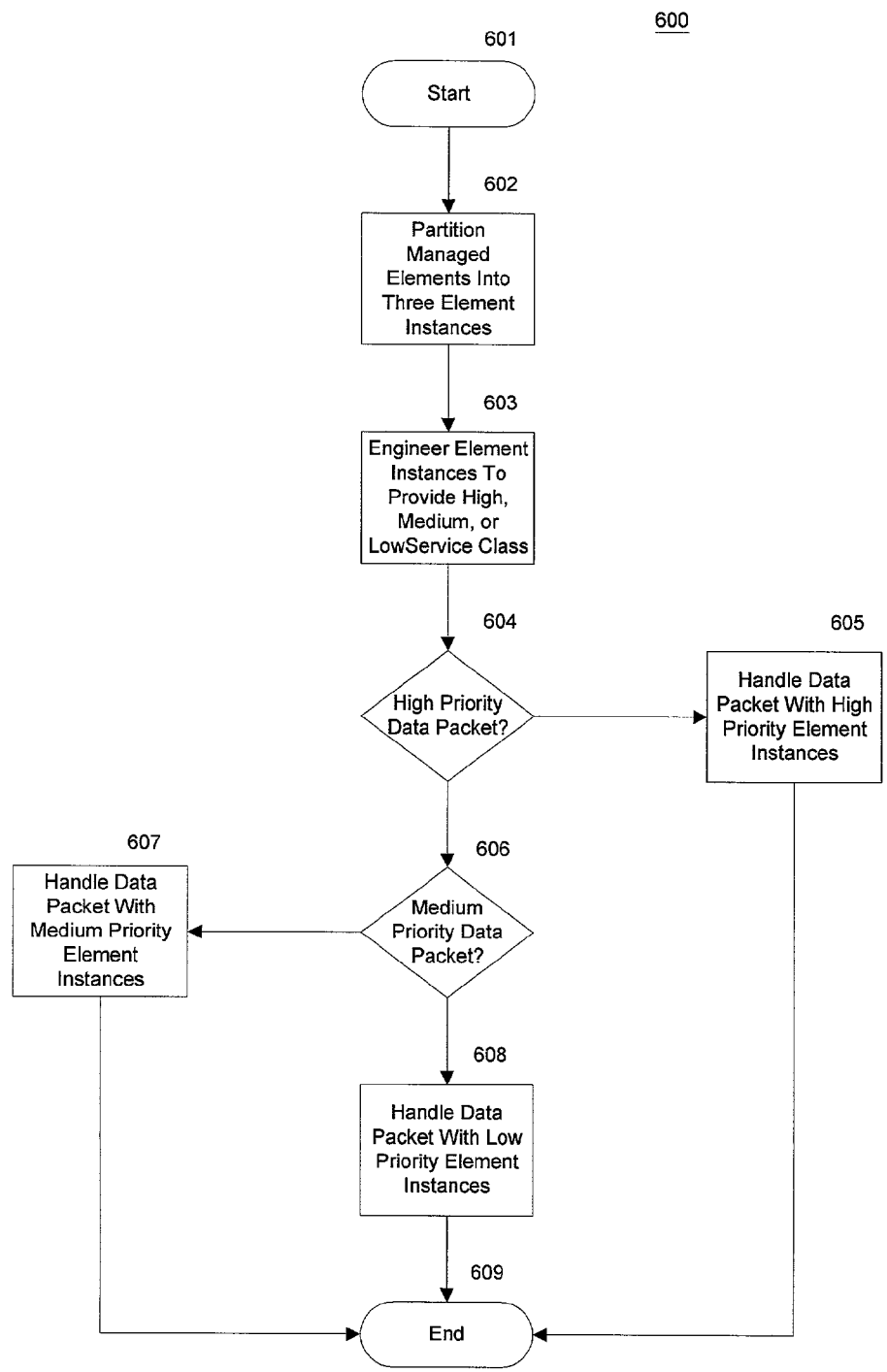
FIG. 6 is a flow diagram of an exemplary method of providing a plurality of service classes in a service provider network in accordance with the present invention.

Referring now to FIG. 6, there is shown a flow diagram of a method 600 for providing three service classes in a service provider network according to the present invention. The method begins in step 601 and proceeds to step 602. In step 602 the operator of a service network partitions each of the managed routers within the network into three element instances. In step 603, the network operator engineers each of the three instances at each managed element within the network to provide either high, medium, or low service. In step 604 a managed element lying near the edge of the network receives and a data packet and determines whether it is to be afforded a high service class. If yes, in step 605 the data packet is assigned to the high service class and handled only by high service class element instances as it traverses the high service class network towards its destination address. If no, in step 606 the edge element determines whether the data packet is to be afforded a medium service class. If yes, in step 607 the data packet is assigned to the medium service class and handled only by medium service class element instances as it traverses the medium service class network towards its destination address. If no, in step 608 the data packet is assigned to the low service class and handled only by low service class element instances as it traverses the low service class network towards its destination address. In step 609 method 600 terminates.

While the invention has been described in connection with the embodiments depicted in the various figures, it is to be understood that many other embodiments may exist and many modifications and additions may be made to the described embodiments without departing from the spirit of the invention. Therefore, the invention is not to be limited to any of the embodiments shown and described above, but rather construed in breadth and scope in accordance with the claims appended below.

I claim:

1. A managed network element for handling a data packet, the managed network element connected to a plurality of managed network elements, the data packet to be afforded one of a plurality of service classes, wherein the service class is predetermined at one of the plurality of managed network elements, comprising, a memory, a processor in communication with the memory, executable code running on the processor, and a forwarding table stored in the memory, the memory, processor, executable code, and the forwarding table collectively comprising the element resources, the element resources being partitioned into a plurality of element instances, each element instance being engineered to provide one of the service classes, wherein the element instances providing identical service classes are connected to one another via permanent virtual circuits.

2. The network element of claim 1, wherein the element resources further comprise an application specific integrated circuit.

3. The network element of claim 1, wherein the element resources further comprise a programmable gate array.

4. The network element of claim 1, wherein the element resources further comprise a reprogrammable gate array.

5. A managed network element for handling a data packet, the managed network element connected to a plurality of managed network elements, the data packet to be afforded one of a plurality of service classes, wherein the service class is predetermined at one of the plurality of managed network elements, comprising, a memory, a processor in communication with the memory, a forwarding table stored in the memory, and an application specific integrated circuit (ASIC), the memory, processor, ASIC, and forwarding table comprising the element resources, the element resources being partitioned into a plurality of element instances, each element instance being engineered to provide one of the service classes, wherein the element instances are connected to each other via permanent virtual circuits.

* * * * *